(12) United States Patent
Kelly

(10) Patent No.: US 10,731,346 B2
(45) Date of Patent: *Aug. 4, 2020

(54) ROOFING COVER BOARD WITH COATING

(71) Applicant: Thomas L. Kelly, Waterbury, CT (US)

(72) Inventor: Thomas L. Kelly, Waterbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/921,017

(22) Filed: Mar. 14, 2018

(65) Prior Publication Data

US 2018/0266111 A1 Sep. 20, 2018

Related U.S. Application Data

(60) Provisional application No. 62/472,241, filed on Mar. 16, 2017, provisional application No. 62/576,454, filed on Oct. 24, 2017.

(51) Int. Cl.
B32B 1/00 (2006.01)
E04D 3/35 (2006.01)
E04B 1/94 (2006.01)
E04C 2/26 (2006.01)
E04C 2/24 (2006.01)

(52) U.S. Cl.
CPC ............... E04D 3/35 (2013.01); B32B 1/00 (2013.01); E04B 1/942 (2013.01); E04C 2/246 (2013.01); E04C 2/26 (2013.01); E04D 3/351 (2013.01)

(58) Field of Classification Search
CPC ................. B32B 27/08; B32B 27/32
USPC ............... 428/212, 220, 422.8, 523
See application file for complete search history.

(56) References Cited

U.S. PATENT DOCUMENTS

| 4,488,385 A | 12/1984 | Teasel et al. |
| 4,668,315 A * | 5/1987 | Brady ............... E04D 11/02 156/278 |
| 6,764,625 B2 | 7/2004 | Walsh et al. |
| 7,073,306 B1 | 7/2006 | Hagaman |
| 7,351,462 B2 | 4/2008 | Friedman et al. |
| 7,527,865 B2 | 5/2009 | Kessing |
| 7,984,594 B1 | 7/2011 | Propst |
| 8,127,509 B2 | 3/2012 | Propst |
| 8,147,733 B2 | 4/2012 | Shiina et al. |
| 8,337,993 B2 | 12/2012 | Surace et al. |
| 8,394,505 B2 | 3/2013 | Girstl |
| 8,440,296 B2 | 5/2013 | Kipp et al. |
| 8,458,983 B2 | 6/2013 | Propst |
| 8,707,643 B1 | 4/2014 | Kalkanoglu et al. |
| 8,776,476 B2 | 7/2014 | Propst |

(Continued)

FOREIGN PATENT DOCUMENTS

| CA | 2864703 A1 | 3/2015 |
| WO | 2010141190 A2 | 12/2010 |

(Continued)

OTHER PUBLICATIONS

Letter received from Foley & Lardner LLP dated Dec. 17, 2019, 3 pages.

Primary Examiner — Lawrence D Ferguson
(74) Attorney, Agent, or Firm — Cantor Colburn LLP

(57) ABSTRACT

A cover board for use in a roofing system includes a core formed from recycled material. The core has a first major surface and a second major surface. The recycled material includes a plastic material. A fiberglass coating including at least one layer of fiberglass material overlies at least one of the first major surface and the second major surface.

13 Claims, 5 Drawing Sheets

(56) References Cited

U.S. PATENT DOCUMENTS

| | | |
|---|---|---|
| 8,916,277 B2 | 12/2014 | Surace et al. |
| 9,027,300 B2 | 5/2015 | Propst |
| 9,032,679 B2 | 5/2015 | Propst |
| 9,097,016 B2 | 8/2015 | Propst |
| 9,259,860 B2 | 2/2016 | Kalkanoglu et al. |
| 9,818,380 B2 | 11/2017 | Luttwak |
| 9,840,851 B2 | 12/2017 | Propst |
| 10,167,630 B2 | 1/2019 | Giles |
| 10,273,638 B1 | 4/2019 | Penland, Jr. |
| 10,273,697 B2 | 4/2019 | Horton et al. |
| 10,352,059 B2 | 7/2019 | Vaidya et al. |
| 10,415,240 B2 | 9/2019 | Wawi |
| 10,227,778 B2 | 12/2019 | Schroeder et al. |
| 10,556,413 B2 | 2/2020 | Cossins |
| 2004/0101674 A1 | 5/2004 | Ross |
| 2005/0193666 A1 | 9/2005 | McConnell et al. |
| 2006/0096205 A1 | 5/2006 | Griffin et al. |
| 2008/0233375 A1* | 9/2008 | Wright ............... C08J 5/18 428/219 |
| 2009/0104407 A1 | 4/2009 | Johnson et al. |
| 2010/0037548 A1 | 2/2010 | Kalkanoglu et al. |
| 2012/0003455 A1 | 1/2012 | Johnson et al. |
| 2013/0316125 A1 | 11/2013 | Moeller et al. |
| 2014/0004336 A1* | 1/2014 | Dou ............... B32B 7/12 428/327 |
| 2014/0072808 A1* | 3/2014 | Peng ............... E04D 5/10 428/422.8 |
| 2016/0010336 A1* | 1/2016 | Kelly ............... E04D 3/02 52/408 |
| 2018/0266112 A1 | 9/2018 | Kelly |
| 2019/0257089 A1 | 8/2019 | Kelly |

FOREIGN PATENT DOCUMENTS

| | | |
|---|---|---|
| WO | 2011117569 A1 | 9/2011 |
| WO | 2012064038 A2 | 5/2012 |
| WO | 2012102287 A1 | 8/2012 |
| WO | 2012149354 A1 | 11/2012 |
| WO | 2014132229 A1 | 9/2014 |

\* cited by examiner

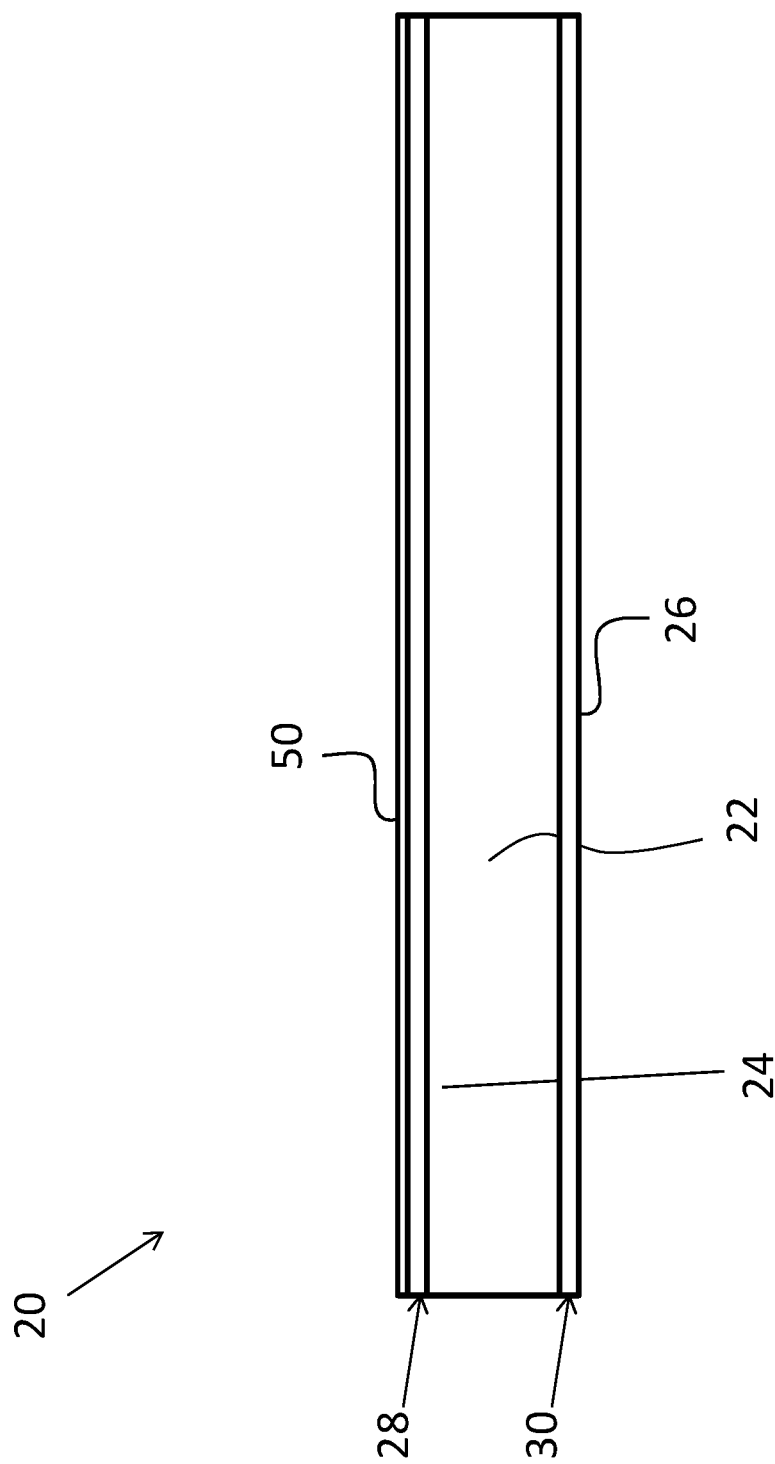

ROOFING COVER BOARD WITH COATING

CROSS-REFERENCE TO RELATED APPLICATIONS

This application claims the benefit of U.S. Provisional Application Ser. No. 62/472,241, filed Mar. 16, 2017 and U.S. Provisional Application Ser. No. 62/576,454, filed Oct. 24, 2017, which are incorporated herein by reference in their entirety.

BACKGROUND

Exemplary embodiments of the invention relate to a roofing system, and more particularly, to a cover board for use in a roofing system having a flat or low-slope roof.

Commercial and residential buildings having a flat or low-slope roof deck typically include a roofing system having at least one layer of insulation, a layer of roofing cover boards that overlie the one or more layers of insulation, and a waterproofing membrane that overlies the upper surface of the cover boards. The insulation is susceptible to damage, such as from the weather and other causes commonly encountered in roofing construction. The rigidity of the roofing cover board is intended to protect the more fragile insulation from damage. The waterproofing membrane overlying the cover board layer protects both the cover board and the insulation from moisture and other adverse climatic conditions. Normally, these three components are installed in succession to build the roofing system for a flat or low-slope roof deck.

While these roofing systems function well, there remains a need to provide improved roofing cover boards.

BRIEF SUMMARY OF THE INVENTION

According to one embodiment of the invention, a cover board for use in a roofing system includes a core formed from recycled material. The core has a first major surface and a second major surface. The recycled material includes a plastic material. A fiberglass coating including at least one layer of fiberglass material overlies at least one of the first major surface and the second major surface.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 5 is a cross-sectional view of a cover board including a secondary coating according to an embodiment.

The detailed description explains embodiments of the invention, together with advantages and features, by way of example with reference to the drawings.

DETAILED DESCRIPTION

Figure 1:
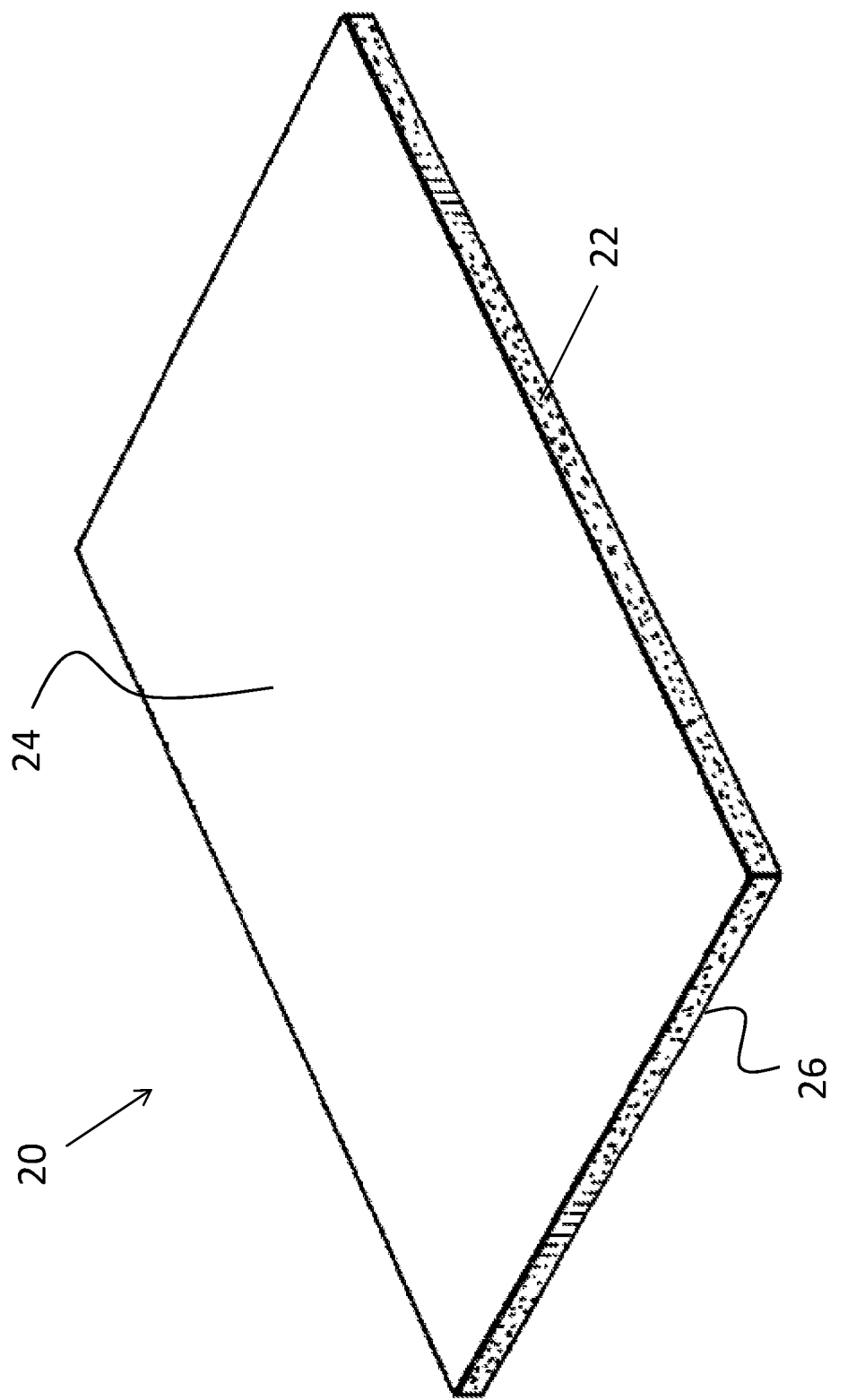
FIG. 1 is a perspective view of a cover board for use in a roofing application according to an embodiment.

Referring now to FIG. 1, a perspective view of an example of a cover board 20 configured for use in building applications is illustrated. The cover board 20 may be used in a variety of applications within a roofing system, such as for overlayment, underlayment, as a separator board, as a vapor barrier substrate, and as a recover board in reroofing applications. Although the cover board 20 is described with reference to a roofing system, it should be understood that the cover board 20 described herein may also be used in other building applications. For example, the cover board 20 may be configured to replace plywood applied to the exterior of a housing frame.

The weight of the cover board 20 is generally between about 1 pound per square foot and about 15 pounds per square foot, such as between 1-10, 1-5, and 1-3 pounds per square foot. The weight of the cover board 20 may vary in part based on the thickness of the cover board 20, and is selected based on the intended application of the cover board 20.

In the non-limiting embodiment illustrated in FIG. 1, the cover board 20 is generally rectangular in shape. However, it should be understood that a cover board 20 having any shape is within the scope of the disclosure. The cover board 20 includes a core 22 having a first major surface 24 and a second major surface 26 arranged on opposing sides thereof. The first major surface 24 and the second major surface 26 are defined as the surfaces of the cover board 20 having the greatest surface area. In the illustrated, non-limiting embodiment, the first and second major surfaces 24, 26 are defined by the length and width of the cover board 20.

The core 22 of the cover board 20 comprises a moisture and mold composite material. In an embodiment, the composite material is formed entirely from recycled materials, such as beverage cartons and cups, and freezer food cartons (i.e. ice cream cartons) for example. In an embodiment, the recycled materials are shredded and then heated and compressed within a fixture to form the core 22. As the recycled, plastic coated material is heated and compressed, the plastic therein melts and acts a binder for the non-meltable materials, such as cardboard or heavy paper for example. In an embodiment, the non-meltable materials are encapsulated with the plastic, such as a low density polyethylene. Accordingly, the core 22 is formed without the use of water, adhesive, formaldehyde glues, or other hazardous chemicals. As a result, the cover board 20 is free from volatile organic compounds.

Figure 2:
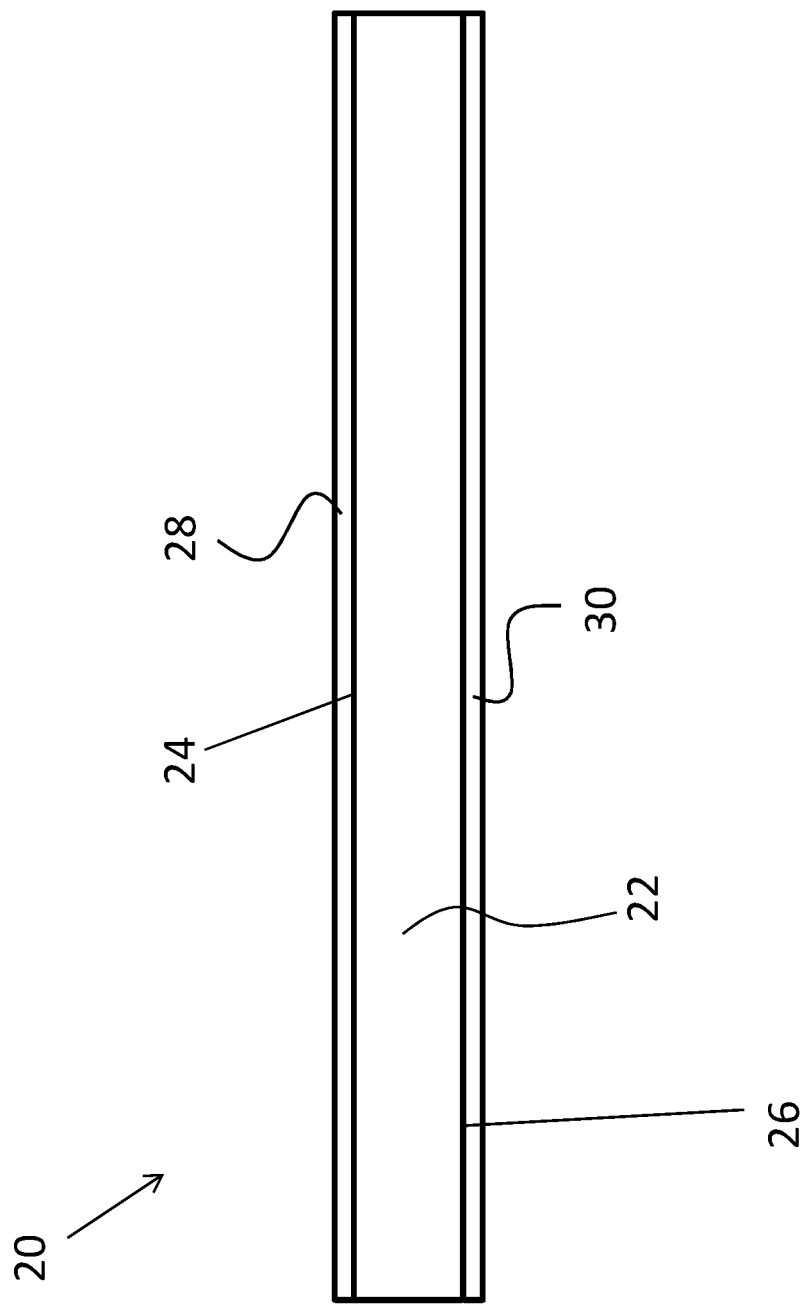
FIG. 2 is a cross-sectional view of a cover board including a facing layer according to an embodiment.

With reference now to FIG. 2, the cover board 20 may additionally include a first facing layer 28 and/or a second facing layer 30 in an overlapping arrangement with the first and second major surfaces 24, 26, respectively. Inclusion of the facing layers 28, 30 is intended to provide surface strength to the core 22 of the cover board 20. The facing layers 28, 30 may be configured to overlap the entirety, or only a portion, of a corresponding major surface 24, 26. The first and second facing layers 28, 30 may be any sheet material suitable for use with the cover board 20, such as paper or a woven material for example. In embodiments where the cover board 20 includes both a first facing layer 28 and a second facing layer 30, the first and second facing layers 28, 30 may, but need not be, formed from the same material or overlie the same portion of the cover board 20.

Figure 3:
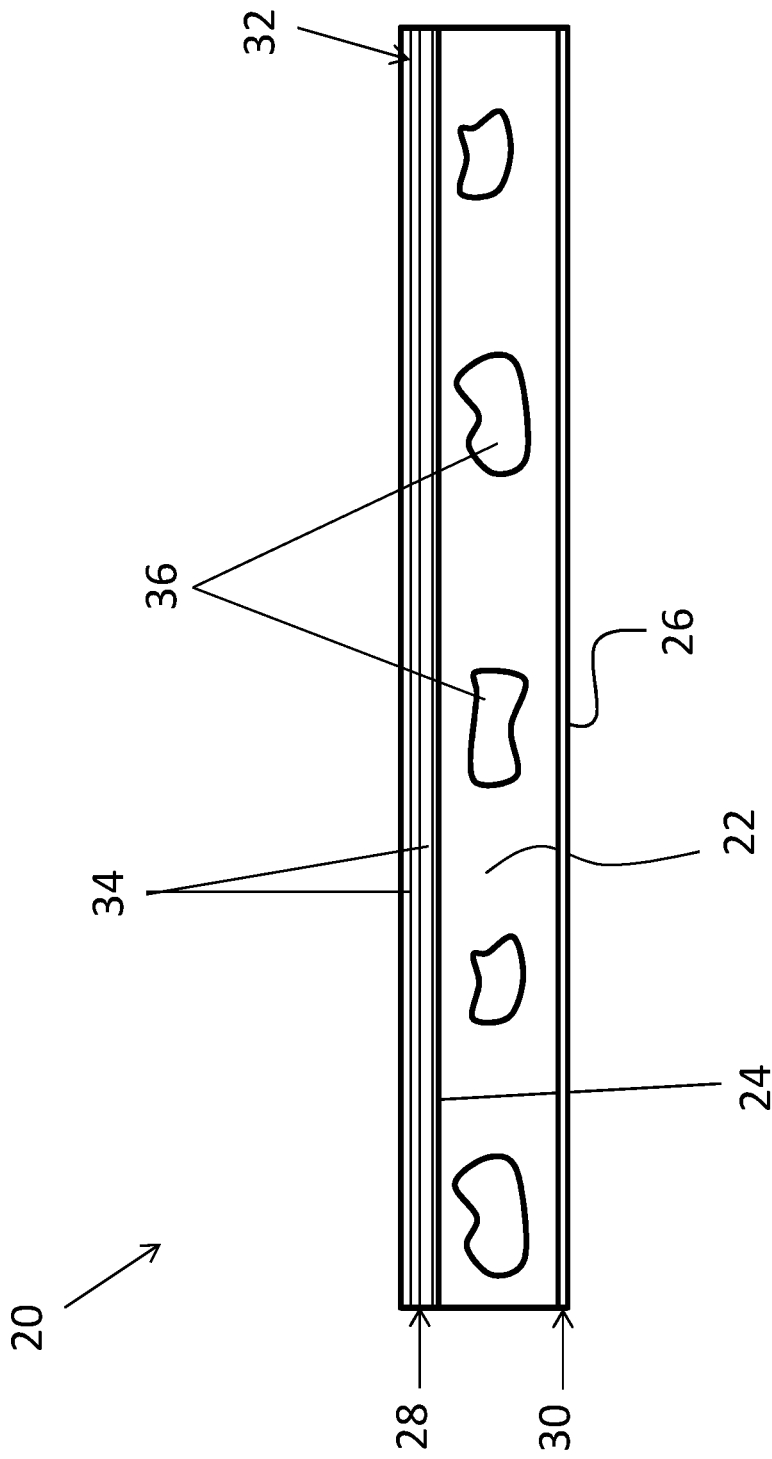
FIG. 3 is a cross-sectional view of a cover board including a fiberglass coating according to an embodiment.
Figure 4:
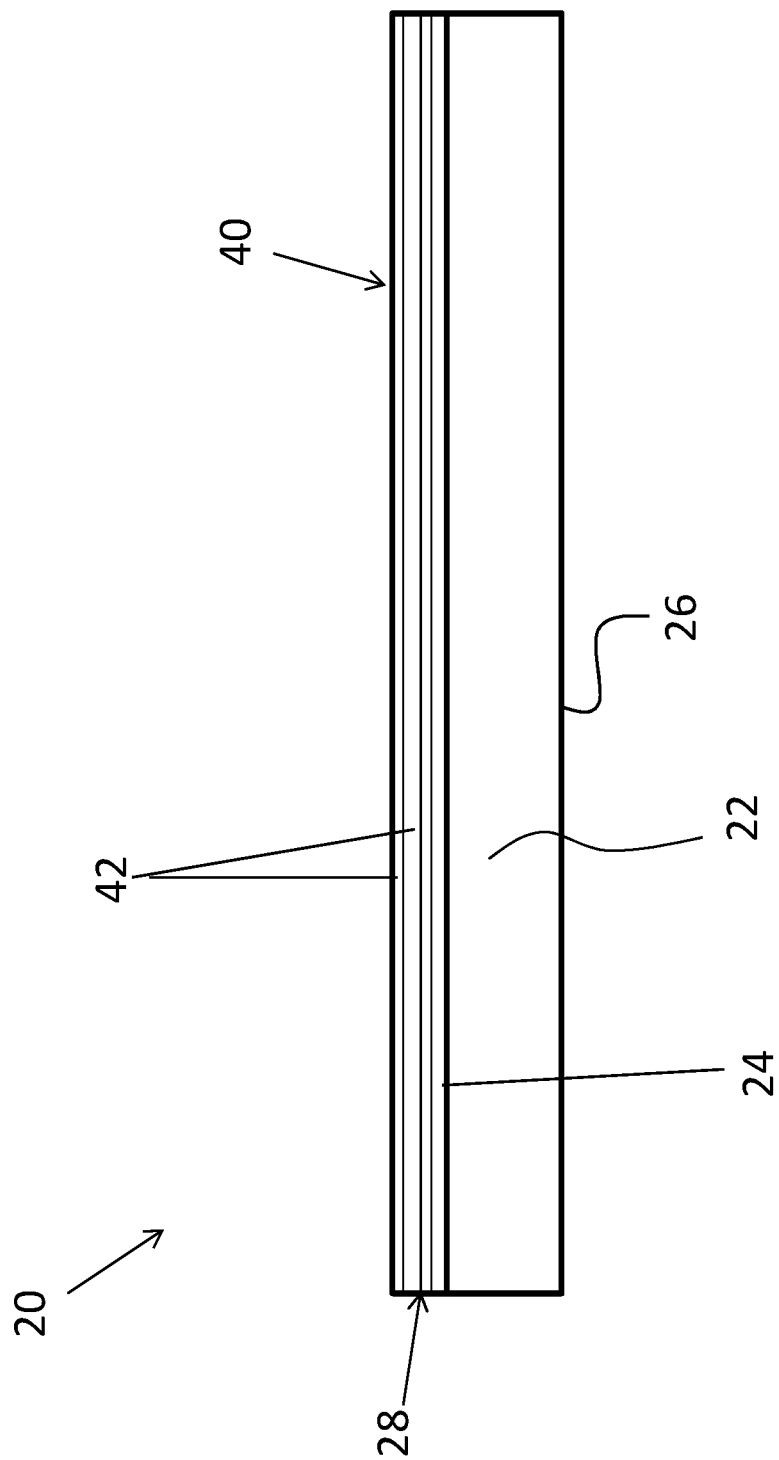
FIG. 4 is a cross-sectional view of a cover board including a foil coating according to an embodiment.

Conventional cover boards typically have both the first facing layer 28 and the second facing layer 30 formed from a Kraft paper material. The Kraft paper may be any color, such as brown or white for example. A cover board 20 as described herein includes at least one of the first facing layer 28 and the second facing layer 30 comprising a fiberglass coating 32 defined by one or more layers of a fiberglass material 34, as shown in FIG. 3. It should be understood that any suitable configuration of the coating, such as a matt or film for example is contemplated herein. In an embodiment, the one or more layers of fiberglass material 34 overlie at least one of the major surfaces 24, 26 of the cover board 20. In such embodiments, the thickness of the facing layer 28, 30 including a fiberglass coating 32 may be the same, or alternatively, may be different, for example greater, than if the facing layer 28, 30 is formed from another material, such as Kraft paper for example. Although only the first facing layer 28 is illustrated as including a fiberglass coating 32, it should be understood that embodiments where both the first and second facing layers 28, 30 include a fiberglass coating 32 are contemplated herein. It should also be understood that embodiments where the fiberglass coating 32 extends over additional surfaces of the cover board 20 besides the major surfaces 24, 26 are also within the scope of the disclosure.

Fiberglass material is less susceptible to failure in shear than other materials used in roofing systems and as a result, the overall strength of the cover board 20 having at least one facing layer 28, 30 including a fiberglass coating 32 is enhanced. In addition, inclusion of a fiberglass coating 32 will augment the fire resistant properties of the cover board 20. Because fiberglass does not burn under normal circumstances, the fiberglass coating 32 will assist in maintaining the structural integrity of the cover board 20 in the event of a fire. Accordingly, the fire-resistant properties of the recycled core 22 may be improved by application of a fiberglass coating 32 such that the cover board 20 is sufficient to act as a fire barrier as required by commercial and residential building codes. In addition, a fire coating material, such as silicone for example, adheres more effectively to the cover board 20 having the fiberglass coating 32 than a cover board 20 without such a coating.

In embodiments where the cover board 20 includes a fiberglass coating 32 directly or indirectly overlying at least one of the first major surface 24 and the second major surface 26, the core layer 22 may include additional plastic material, illustrated schematically at 36, compared to a core layer 22 of the cover board 20 without a fiberglass coating 32. The inclusion of this additional plastic material 36 will strengthen the bond formed between the fiberglass coating 32 and the core 22 of the cover board 20. In an embodiment, the additional plastic 36 may be added in the form of a low density polyethylene, for example through the entire core 22. Further, to maintain the 100% recycled content of the core 22, the plastic may be added in the form of processed garbage bags.

Alternatively, or in addition, at least one of the first facing layer 28 and the second facing layer 30 may comprise a foil coating 40 in overlapping arrangement with at least one of the first major surface 24 and the second major surface 26 of the core 22, respectively. The foil coating 40 may be formed from one or more layers of a foil material 42. The at least one layer of foil material 42 may be located directly adjacent the core 22. The thickness of a facing layer 28, 30 including a foil coating 40 may be the same, or alternatively, may be different, for example greater, than if the facing layer 28, 30 is formed from another material, such as Kraft paper, or fiberglass for example. Although only the first facing layer 28 is illustrated as including a foil coating 40, it should be understood that embodiments where both the first and second facing layers 28, 30 include a foil coating 40 are contemplated herein. It should also be understood that embodiments where the foil coating 40 extends over additional surfaces of the cover board 20 besides the major surfaces 24, 26 are also within the scope of the disclosure.

The foil coating 40 including at least one layer of a foil material 42 functions as thermal insulation that inhibits radiant heat transfer. Accordingly, the foil coating 40 acts as a radiant barrier, which can reduce the heat loss of a building through its roof. A cover board 20 having a foil coating 40 as described herein is particularly beneficial in roofing systems that include a wooden deck.

In yet another embodiment, at least one of the first facing layer 28 and the second facing layer 30 may include a cellophane material. The cellophane may, but need not be located directly adjacent the core 22. It should be understood that the cellophane may be used independently of in combination with any of the other suitable facing materials, such as fiberglass, Kraft paper, foil and silicone for example.

In addition, it should be understood that embodiments of the cover board 20 having a first facing layer 28 comprising a Kraft paper, and second facing layer 30 comprising at least one of a fiberglass coating 32, a foil coating 40, a cellophane material, are contemplated herein. In addition, embodiments of the cover board 20 having a first facing layer 28 comprising a fiberglass coating 32 and second facing layer 30 comprising a foil coating 40 are contemplated herein. Accordingly, the fiberglass coating 32 and the foil coating 40 may be arranged adjacent opposite major surfaces 24, 26 of the core 22, or alternatively, may overlie the same major surface 24, 26 of the core 22.

With reference to FIG. 5, a secondary coating 50 may be applied to one or more of the facing layers 28, 30 of the cover board 20. In an embodiment, the secondary coating 50 is a sealant, such as a fire proof material or silicone roof coating for example; however, other suitable sealants are also contemplated herein. The sealant is particularly useful when applied to a facing layer comprising a fiberglass coating 32, or a facing layer comprising a Kraft paper. Alternatively, the secondary coating 50 may be applied to the facing layers 28, 30 to make the cover board 20 easier to handle. An example of a secondary coating 50 intended for such a purpose includes a clay material.

The facing layers 28, 30 described herein, i.e. Kraft paper, fiberglass coating, foil coating 40, cellophane, and a secondary coating 50, are affixed to a corresponding major surface 24, 26 of the core 22 via any suitable means. In an embodiment, regardless of material, the facing layers 28, 30 are affixed to a surface of the core 22 without the use of a glue or mechanical fastener for example. In an embodiment, the facing layers 28, 30 are positioned between a heated surface of a press and the uncompressed recycled material of the core 22 during manufacturing. The facing layers 28, 30 function as carrier films that prevent the surface of the press from undesirably sticking to the core 22 after heated compression has occurred. As a result, during manufacturing, the melted plastic of the recycled material, specifically the low density polyethylene, acts as an adhesive to integrally form the facing layers 28, 30 with the exterior surfaces of the core 22.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A cover board of a roofing system, comprising:
 a core formed from recycled material, the core having a first major surface and a second major surface, wherein the recycled material includes a non-meltable material encapsulated by a plastic material, the non-meltable material including a cardboard; and
 a fiberglass coating including at least one layer of fiberglass material overlying at least one of the first major surface and the second major surface.

2. The cover board of claim 1, wherein the fiberglass coating is adhered to at least one of the first major surface and the second major surface.

3. The cover board of claim 1, further comprising a facing layer directly adjacent at least one of the first major surface and the second major surface.

4. The cover board of claim 3, wherein the facing layer comprises a fiberglass material such that the facing layer forms the fiberglass coating.

5. The cover board of claim 3, wherein the facing layer is disposed between the fiberglass coating and at least one of the first major surface and the second major surface.

6. The cover board of claim 5, wherein the facing layer is formed from paper.

7. The cover board of claim 1, wherein the plastic material includes a low density polyethylene.

8. The cover board of claim 1, wherein the plastic material is provided as at least one garbage bag.

9. The cover board of claim 1, wherein the recycled material is shredded and compressed.

10. The cover board of claim 1, wherein the cover board provides a fire barrier in the roofing system.

11. The cover board of claim 1, wherein said weighted cover board has a weight between 1 pound/square foot and 25 pounds/square foot.

12. A cover board of a roofing system, comprising:
 a core formed from recycled material, the core having a first major surface and a second major surface, wherein the recycled material includes a non-meltable material encapsulated by a plastic material, the non-meltable material including a cardboard;
 a facing layer directly adjacent the first major surface, the facing layer including at least one of a foil coating, fiberglass coating, a cellophane and a Kraft paper; and
 a secondary coating disposed in overlapping arrangement with the facing layer.

13. The cover board of claim 12, wherein the secondary coating is a silicone.

* * * * *